United States Patent
McColloch

(10) Patent No.: US 9,279,943 B1
(45) Date of Patent: Mar. 8, 2016

(54) PRECISION ALIGNMENT OF OPTICAL FIBER ENDS ALONG RESPECTIVE OPTICAL PATHWAYS IN A MULTI-OPTICAL FIBER CONNECTOR MODULE, AND METHODS

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/500,313

(22) Filed: Sep. 29, 2014

(51) Int. Cl.
*G02B 6/36* (2006.01)
*G02B 6/38* (2006.01)

(52) U.S. Cl.
CPC ............ *G02B 6/3839* (2013.01); *G02B 6/3853* (2013.01); *G02B 6/3855* (2013.01)

(58) Field of Classification Search
CPC ... G02B 6/3853; G02B 6/3839; G02B 6/3855
USPC .......................................................... 385/79
See application file for complete search history.

(56) References Cited

U.S. PATENT DOCUMENTS

| | | | |
|---|---|---|---|
| 6,044,186 A | 3/2000 | Chang et al. | |
| 6,075,914 A * | 6/2000 | Yeandle | G02B 6/30 385/49 |
| 7,058,275 B2 | 6/2006 | Sezerman et al. | |
| 8,529,140 B2 * | 9/2013 | McColloch | G02B 6/4204 385/88 |
| 8,926,199 B1 * | 1/2015 | Chan et al. | G02B 6/4257 385/76 |
| 2004/0071407 A1 * | 4/2004 | Vergeest | G02B 6/3809 385/58 |
| 2005/0018993 A1 * | 1/2005 | Rolston | G02B 6/3839 385/137 |
| 2010/0135618 A1 * | 6/2010 | Howard | G02B 6/3829 385/79 |

FOREIGN PATENT DOCUMENTS

| | | | | |
|---|---|---|---|---|
| GB | 2381084 A * | 4/2003 | | G02B 6/30 |
| WO | 2014055226 A1 | 4/2014 | | |

OTHER PUBLICATIONS

OZ Optics, "V-Groove Assemblies USA Patent: 7058275," www.ozoptics.com, Mar. 19, 2009, pp. 1-8, OZ Optics Limited, Ottawa, Canada.

* cited by examiner

*Primary Examiner* — Sung Pak

(57) ABSTRACT

An MF connector module is provided that positions the fiber end portions relative to respective V-grooves of the module in such a way that the fiber end portions can be bent, and thereby loaded, by a predetermined amount when the fiber end portions are being installed in the respective V-grooves. The bending of the fiber end portions ensures that the optical axes of at least the tips of the fiber end portions are parallel to the optical axes of the respective V-grooves. The loading of the fiber end portions caused by the bending ensures that significant lengths of the fiber end portions are tangent to and in contact with the inner walls of the respective V-grooves. This tangential contact between the fiber end portions and the inner walls of the V-grooves causes the fiber end faces to be precisely aligned with the respective optical axes of the MF connector module.

20 Claims, 8 Drawing Sheets

PRECISION ALIGNMENT OF OPTICAL FIBER ENDS ALONG RESPECTIVE OPTICAL PATHWAYS IN A MULTI-OPTICAL FIBER CONNECTOR MODULE, AND METHODS

TECHNICAL FIELD OF THE INVENTION

The invention relates to optical communications. More particularly, the invention relates to a multi-optical fiber connector module configured to ensure alignment of the ends of optical fibers along respective optical axes of the module, and methods.

BACKGROUND OF THE INVENTION

Multi-optical fiber (MF) connector modules are used to mechanically couple the ends of a plurality of optical fibers to a parallel optical communications module that has a plurality of optical channels. The parallel optical communications module may be a parallel optical transceiver module having both transmit and receive optical channels, a parallel optical transmitter module having only transmit optical channels, or a parallel optical receiver module having only receive optical channels. A typical MF connector module includes an optics system that couples light between the ends of the optical fibers held in the MF connector module and the parallel optical communications module. Within the parallel optical communications module, an optics system couples light between the MF connector module and a plurality of optoelectronic devices disposed inside of the parallel optical communications module. For transmit optical channels, the optoelectronic devices are electrical-to-optical converters such as laser diodes or light-emitting diodes (LEDs). For receive optical channels, the optoelectronic devices are optical-to-electrical converters such as P-intrinsic-N (PIN) photodiodes.

The MF connector modules and the parallel optical communications modules typically have mating features on them that allow them to be fixedly or removably mechanically coupled (i.e., mated) with one another. A variety of MF connector modules and parallel optical communications modules exist in the market today that are designed to mate with one another in a way that optically aligns the optical pathways between the ends of the optical fibers and the respective optoelectronic devices to enable optical data signals to be efficiently optically coupled between ends of the optical fibers and the respective optoelectronic devices. In designing and manufacturing the MF connector modules and the corresponding parallel optical communications modules, great care is taken to ensure that once the modules are mated together, very precise optical alignment exists along the optical pathways.

Inside of the MF connector module, the ends of the optical fibers are typically held in alignment with respective lenses of the optics system of the MF connector module. The lenses of the connector module couple light between the ends of the optical fibers and the optics system of the parallel optical communications module, which often folds the optical pathways by some angle (e.g., 90°). However, the folding of the optical pathways is sometimes performed by the optics system of the MF connector module, or folding may be performed by each of the optics systems.

The alignment of the optical pathways that extend between the ends of the optical fibers, the optics system of the MF connector module, the optics system of the parallel optical communications module, and the optoelectronic devices of the parallel optical communications module should be very precise in order to ensure good optical coupling efficiency and good performance. A variety of configurations exist for holding the ends of the fibers in fixed, aligned positions within the MF connector module. It is well known to use a V-groove configuration in the MF connector module for holding the ends of the optical fibers in fixed, aligned positions within the MF connector module. The ends of the optical fibers are positioned in respective V-grooves and then a refractive index matching epoxy is used to fix the ends in position within the respective V-grooves. A cover is sometimes placed over the V-grooves to protect the fiber ends and to help hold them in position.

One potential problem with such V-groove configurations is that the V-grooves do not always perfectly align the ends of the respective fibers with the lenses of the MF module. This is because the optical fibers do not always conform to the V-grooves. The optical fibers tend to act like rigid rods in the V-grooves in that misalignment of the fiber at the back of the V-groove will result in misalignment of the fiber at the front of the V-groove. For example, if the fiber has ridden up the edge of the respective V-groove at the back of the V-groove, it will usually also ride up the edge of the V-groove in the front of the V-groove. In addition, optical fibers of an optical fiber ribbon cable are not always parallel to one another in all planes once the fibers have been freed from the cable and stripped of their jackets. Fibers in a ribbon cable have a "set," which means that when freed from the cable and stripped of their jackets, they curl in multiple directions and are not all parallel in all planes. The fiber "set" makes it difficult to achieve the needed micron-level alignment accuracy of the fiber ends with their respective lenses.

Moreover, if the V-grooves are formed in plastic, the V-grooves may deform in the areas where a load is applied when the fibers are pressed into them. This can cause the front portion of the fiber end (end portion nearest to the lenses) to lift upwards away from the V-groove, even if the deformation is within the elastic stress range of the plastic. This upward lifting of the fiber end in combination with the "set" problem can mean that a different force is acting on each fiber due to its unique set, which can cause the V-grooves to deform by unique amounts for each fiber. This, in turn, can result in a unique alignment error for each fiber.

A need exists for an MF connector module and methods that enable ends of optical fibers to be installed and held in an MF connector module in precise alignment with respective optical axes of the module.

SUMMARY OF THE INVENTION

The invention is directed to an MF connector module, an MF connector module assembly, and a method. The MF connector module comprises a module body comprising a top side, a bottom side, a front end, a back end, a left side, a right side, a chamber formed in the top side of the module body, a ridge, or corner, an optics system, and a plurality of V-grooves. The chamber has at least a front wall, a bottom, a first side wall, and a second side wall. The ridge, or corner, is opposite the front wall of the chamber and extends in a direction that is generally parallel to the front wall of the chamber. The optics system is disposed in or on the front wall of the chamber. The V-grooves are formed in the bottom of the chamber. Each V-groove has a front end and a back end that is opposite the front end. The front end of each V-groove is proximate the optics system. The V-grooves have respective optical axes that are parallel to one another and generally perpendicular to the front wall of the chamber. The ridge is a greater distance from the bottom side of the module body than the grooves are from the bottom side of the module body.

When a plurality of end portions of optical fibers are laid in the chamber, rear locations on the fiber end portions are in contact with the ridge and end faces of the optical fibers are proximate respective V-grooves.

The MF connector module assembly comprises the MF connector module and a plurality of end portions of optical fibers disposed in the chamber with at least tips of the fiber end portions disposed within the respective V-grooves and rear locations on the fiber end portions in contact with the ridge. A predetermined amount of bend, or curve, exists in each fiber end portion between the tips and the rear locations on the fiber end portions that are in contact with the ridge. The bend in each fiber end portion is directed away from the top side of the module body toward the bottom side of the module body. The bends preload the fiber end portions, which causes the tips to properly sit in the respective V-grooves thereby ensuring that optical axes of the tips are coaxially aligned with the optical axes of the respective V-grooves.

The method comprises providing the MF connector module and disposing a plurality of end portions of optical fibers in the chamber with at least tips of the fiber end portions disposed within the respective V-grooves and rear locations on the fiber end portions being in contact with the ridge. A predetermined amount of bend, or curve, exists in each fiber end portion between the tips and the rear locations on the fiber end portions that are in contact with the ridge. The bend in each fiber end portion is directed away from the top side of the module body toward the bottom side of the module body. The bends preload the fiber end portions, which causes the tips to properly sit in the respective V-grooves thereby ensuring that optical axes of the tips are coaxially aligned with the optical axes of the respective V-grooves.

These and other features and advantages of the invention will become apparent from the following description, drawings and claims.

DETAILED DESCRIPTION OF AN ILLUSTRATIVE EMBODIMENT

Figure 1A:
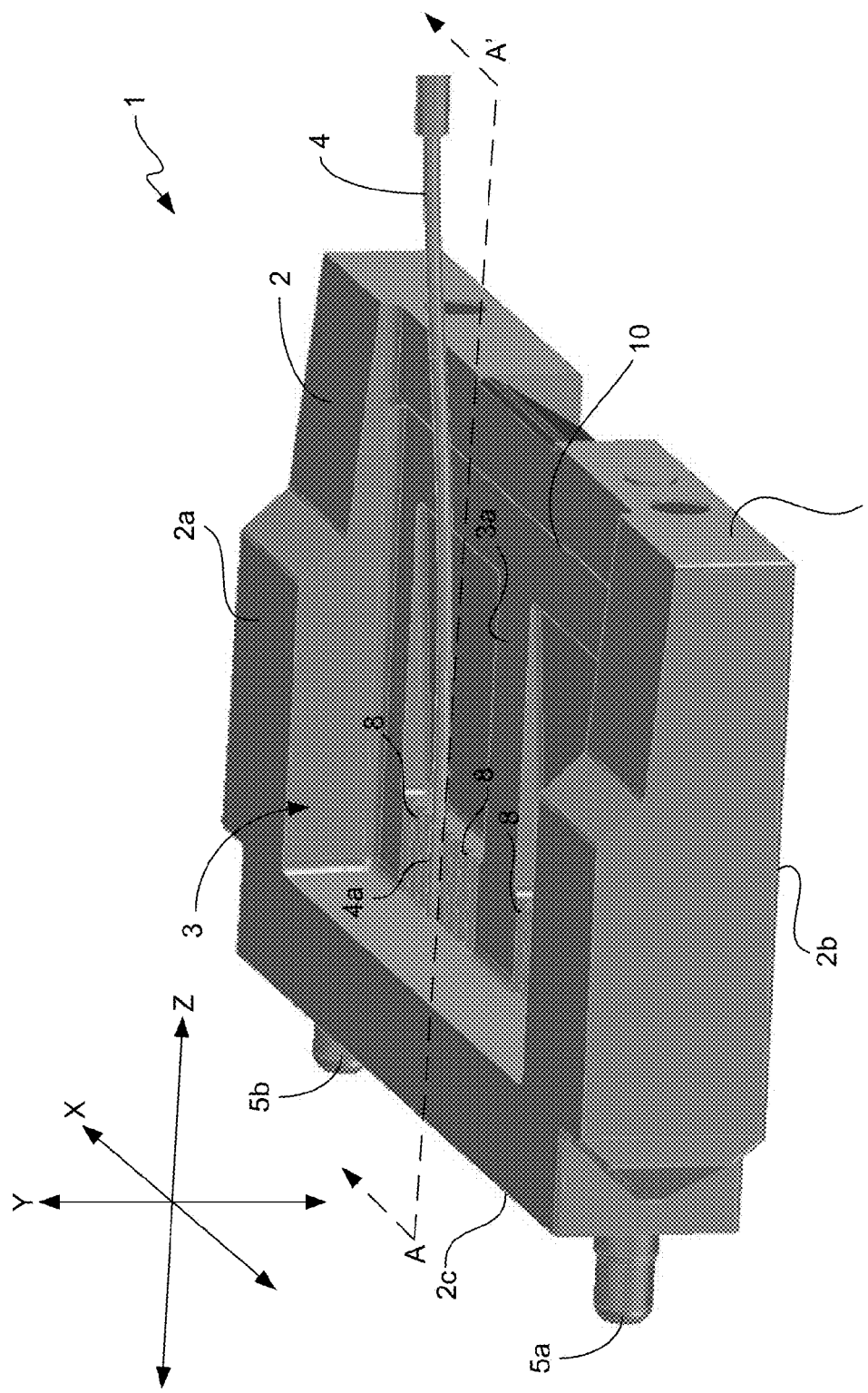
FIG. 1A illustrates a top perspective view of the MF connector module in accordance with an illustrative embodiment.

In accordance with illustrative, or exemplary, embodiments of the invention, an MF connector module is provided that has a configuration that positions the fiber end portions relative to respective V-grooves of the module in such a way that the fiber end portions can be bent, and thereby loaded, by a predetermined amount when the fiber end portions are being installed in the respective V-grooves. The bending of the fiber end portions ensures that the optical axes of at least the tips of the fiber end portions are parallel to the optical axes of the respective V-grooves. The loading of the fiber end portions caused by the bending ensures that significant lengths of the fiber end portions are tangent to and in contact with the inner walls of the respective V-grooves. This tangential contact between the fiber end portions and the inner walls of the respective V-grooves causes the fiber end faces to be precisely aligned with the respective optical axes of the MF connector module. Illustrative embodiments of the MF connector module and of the installation method will now be described with reference to FIGS. 1A-5, in which like reference numerals represent like elements, features or components. It should be noted that elements, features or components in the figures are not necessarily drawn to scale.

Figure 1B:
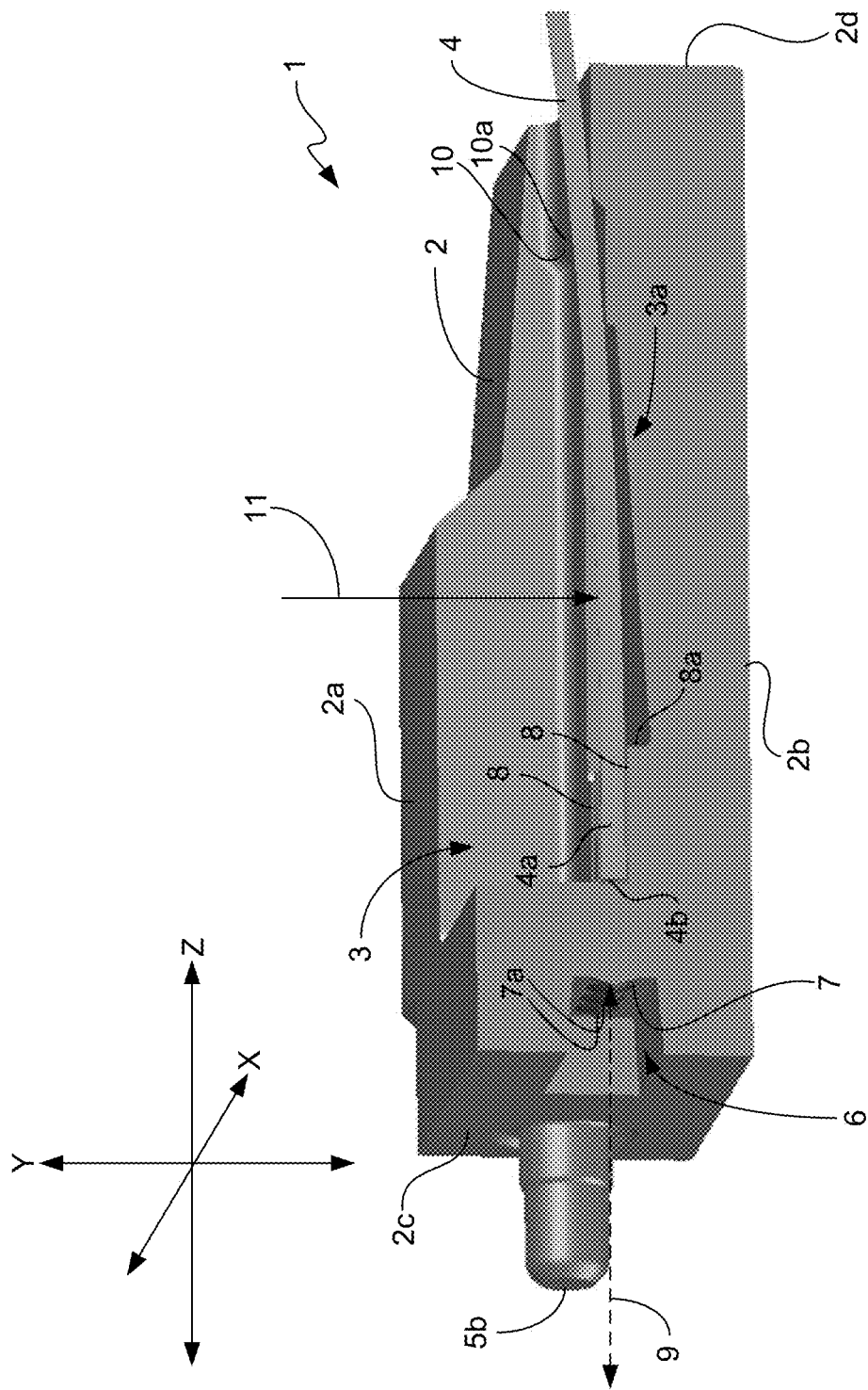
FIG. 1B illustrates a perspective cross-sectional view of the MF connector module shown in FIG. 1A taken along line A-A'.

FIG. 1A illustrates a top perspective view of the MF connector module 1 in accordance with an illustrative embodiment. FIG. 1B illustrates a perspective cross-sectional view of the MF connector module 1 shown in FIG. 1A taken along line A-A'. The MF connector module 1 comprises a module body 2 having an upper surface 2a, a lower surface 2b, a front surface 2c, and a back surface 2d. A cavity 3 is formed in the upper surface 2a and extends a distance in the Y-direction of an X, Y, Z Cartesian coordinate system into the module body 2. The chamber 3 is configured to receive and hold end portions 4a of N optical fibers 4, where N is a positive integer that is equal to or greater than 2. For purposes of clarity, a single optical fiber 4 is shown in FIGS. 1A and 1B. In accordance with this illustrative embodiment, N=16, and thus the MF connector module 1 has sixteen respective optical pathways and sixteen respective optical axes. It should be noted, however, that the invention is not limited with respect to the number of optical fibers that are connected to the MF connector module 1 or with respect to the number of optical channels that are provided in the MF connector module 1.

The module body 2 is typically a molded, unitary plastic part, although the invention is not limited with respect to the material of which the module body 2 is made or with respect to the number of piece parts that are joined together to make the module body 2. The module body 2 has male mating features 5a and 5b extending from its front surface 2c for mating with complementarily-shaped holes (not shown) formed in a body of a parallel optical communications module (not shown) with which the MF connector module 1 is designed to mate. In accordance with this illustrative embodiment, the front surface 2c has a set-back region 6 (FIG. 1B) formed therein within which an optics system 7 (FIG. 1B) of the module 1 is disposed. The optics system 7 comprises a linear array of N lenses 7a (FIG. 1B), each corresponding to one of N optical axes 9 of the MF connector module 1.

When the end portions 4a of the optical fibers 4 are fixedly positioned in the chamber 3, the end portions 4a need to be precisely aligned with the respective optical axes 9 of the respective lenses 7a. The manner in which the configuration of the MF connector module 1 ensures such precise alignment will be described below in detail. The cavity 3 functions as a holding chamber for holding the end portions 4a of the optical fibers 4. The cavity 3 has a lower surface 3a in which a plurality of V-grooves 8 are formed. The V-grooves 8 extend parallel to the Z axis of the X, Y, Z Cartesian Coordinate system shown in FIGS. 1A and 1B. Each V-groove 8 is precisely aligned with a respective lens 7a, and thus the optical axes 8 of the lenses 7a correspond to respective optical axes of the V-grooves 8.

As can best be seen in FIG. 1B, a ridge, or corner, 10 extends across the chamber 3 in the X-direction near the back of the chamber 3. In other words, the ridge 10 is transverse to the optical axes of the V-grooves 8. The ridge 10 is above the V-grooves 8 in the Y-dimension, i.e., the ridge apex 10a has a Y coordinate that is greater than the Y coordinate of the V-grooves 8. When the fiber end portions 4a are laid in the chamber 3, the locations where the end portions 4a rest on the ridge 10 are above (the positive Y direction) the locations where the end portions 4a rest on or are suspended just above the V-grooves 8. This is important because it allows a force to be applied to the fiber end portions 4a to bend them by preselected amounts in order to pre-load them during the installation process, as will be described below in more detail.

In FIG. 1B, it can be seen that when the end portion 4a of the fiber 4 is fully installed in its respective V-groove 8, the outer surface of the fiber end portion 4a is in tangential contact with the V-groove 8 along the entire length, or nearly the entire length, of the V-groove 8. As indicated above, this continuous or nearly continuous tangential contact between the fiber end portion 4a and the respective V-groove 8 causes the fiber end face 4b to be precisely aligned with the respective optical axis 8 of the respective lens 7a of the MF connector module 1. As will be described below in more detail with reference to FIGS. 2 and 3, each fiber end portion 4a is installed in its respective V-groove 8 by using a tool (not shown) that forms a preselected amount of bend in the fiber end portions 4a in between the fiber end faces 4b and the location on the fiber end portions 4a that come into contact with the ridge 10. Arrow 11 in FIG. 1B represents the direction of movement of the tool (not shown) against the fiber end portions 4a to form the preselected amount of bend in the fiber end portions 4a. This bending, or shaping, of the fiber end portions 4a loads them such that they exert a well-controlled force against the respective V-grooves 8, which ensures that the outer surfaces of at least the tips of the fiber end portions 4a are in tangential contact with the respective V-groove 8. This, in turn, ensures that the end faces 4b of the fibers 4 are precisely aligned with the respective lenses 7a along the respective optical axes 8.

Figure 2:
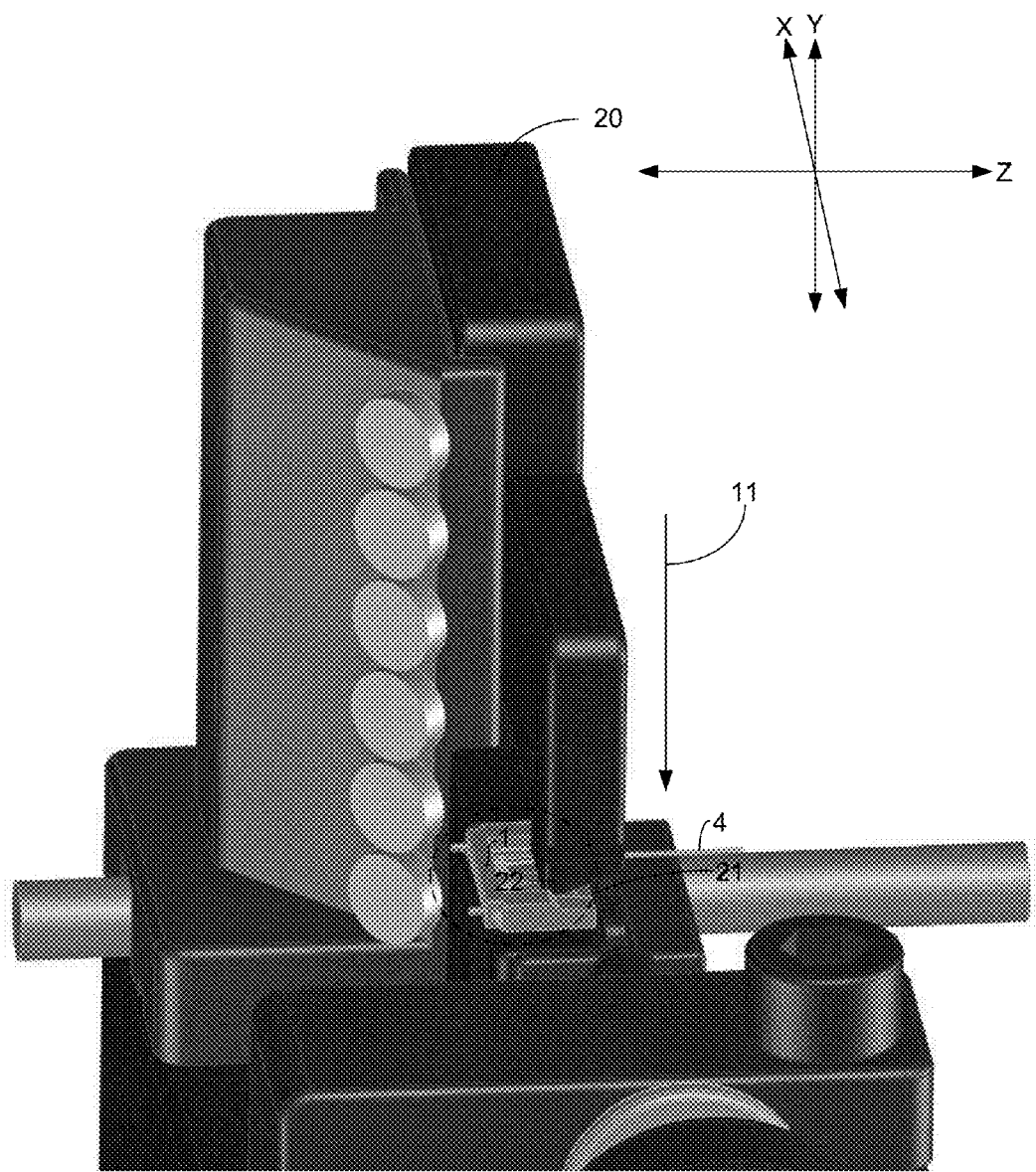
FIG. 2 illustrates a perspective view of a tool that may be used to hold the MF connector module shown in FIGS. 1A and 1B and to apply a force to the fiber end portions to install them in the respective V-grooves of the MF connector module.
Figure 3:
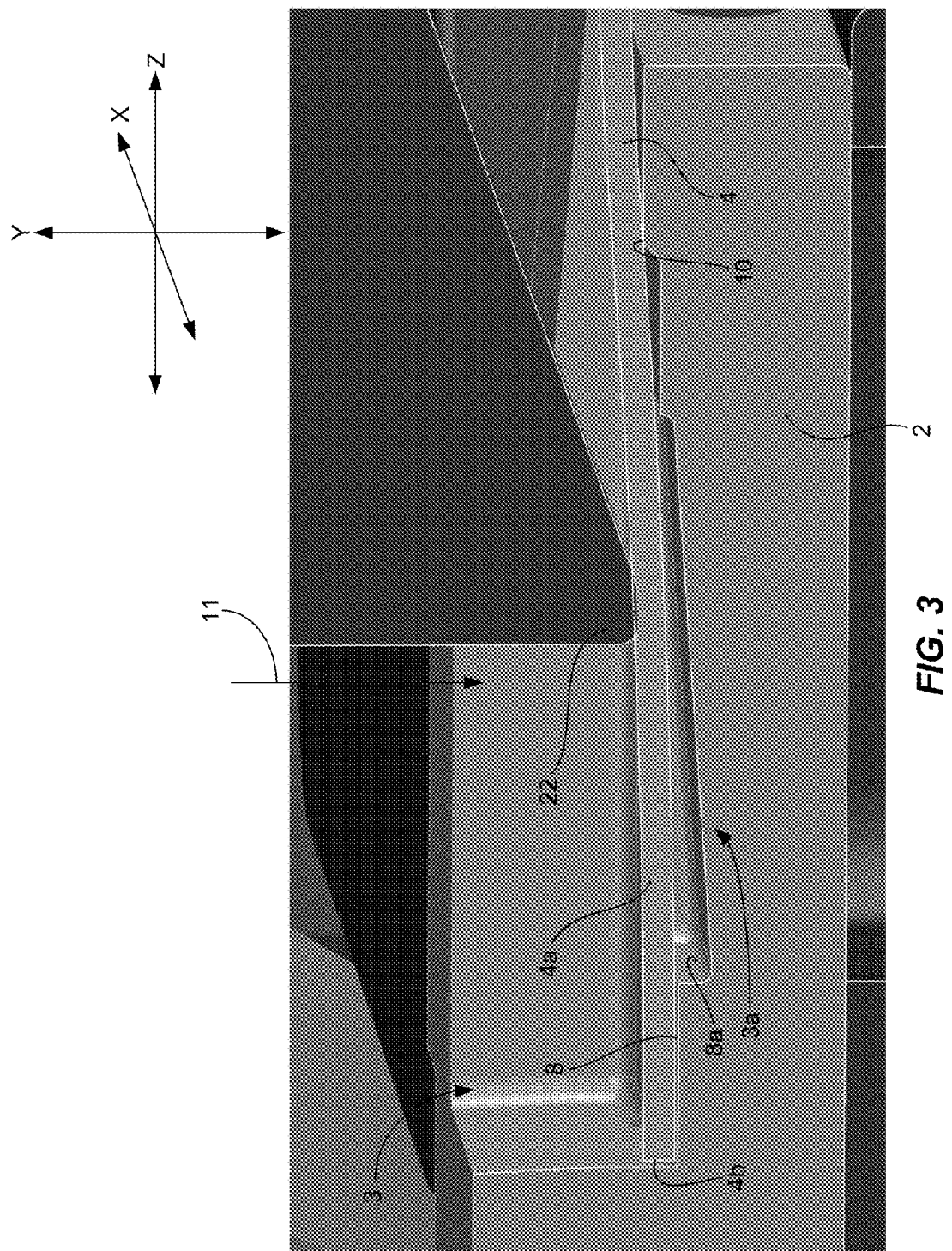
FIG. 3 illustrates an expanded cross-sectional view of a portion of the view shown in FIG. 2.

FIG. 2 illustrates a perspective view of a tool 20 being used to hold the MF connector module 1 shown in FIGS. 1A and 1B as a forming punch 22 of the tool 20 presses against the fiber end portions 4a in the direction represented by arrow 11 to form the preselected bends in the fiber end portions 4a and install them in the respective V-grooves 8 (FIGS. 1A and 1B) of the MF connector module 1. FIG. 3 illustrates an expanded cross-sectional view of the portion of the view shown in the circle labeled with reference numeral 21 in FIG. 2. The forming punch 22 moves a very precise distance relative to the module 1 in the Y-direction represented by arrow 11 to press the fiber end portions 4a against the V-grooves 8 and against the ridge 10 until a predetermined amount of bend has been formed in the fiber end portions 4a. As indicated above, the predetermined amount of bend formed in the fiber end portions 4a loads them with predetermined amounts of force. The tool 20 is designed and manufactured to control the Y positioning of the punch 22 with an accuracy of within 1.0 micrometers (microns). This enables the fiber end portions 4a to be bent or curved by very small amounts to shape the end portions 4a resulting in very small, predetermined, uniform loads. For example, the loads that are placed on the end portions 4a may be on the order of one-one thousandth of a pound (lb), or 0.004 Newtons. These loads on the fiber end portions 4a hold them in the respective V-grooves 8, thereby ensuring that the end faces 4b of the fiber end portions 4a are precisely aligned with the respective lenses 7a (FIG. 1B).

Figure 4A:
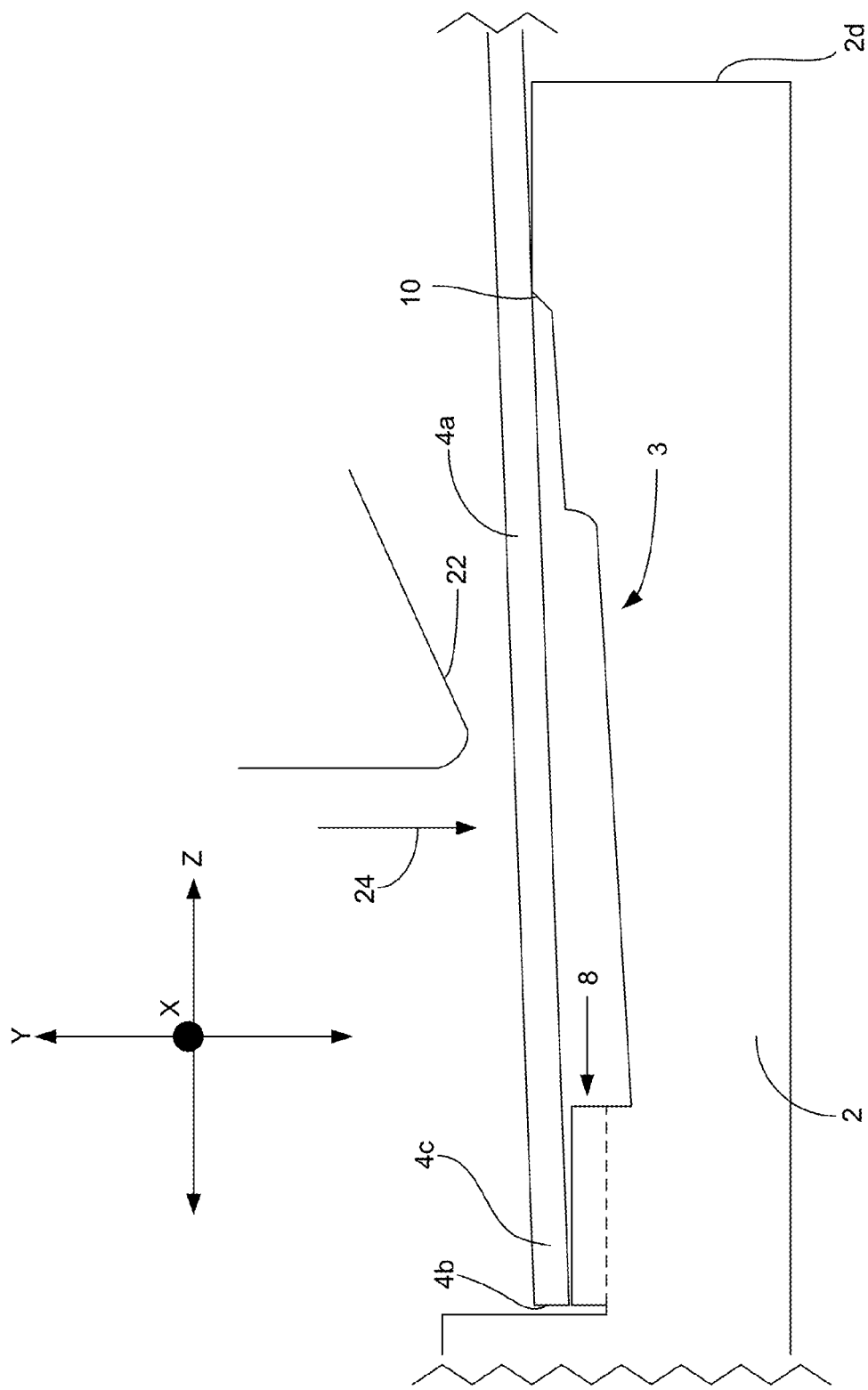
FIGS. 4A-4C illustrate side cross-sectional views of the MF connector module shown in FIGS. 1A and 1B in different stages of installment of the fiber end portions in the V-grooves of the MF connector module.
Figure 4B:
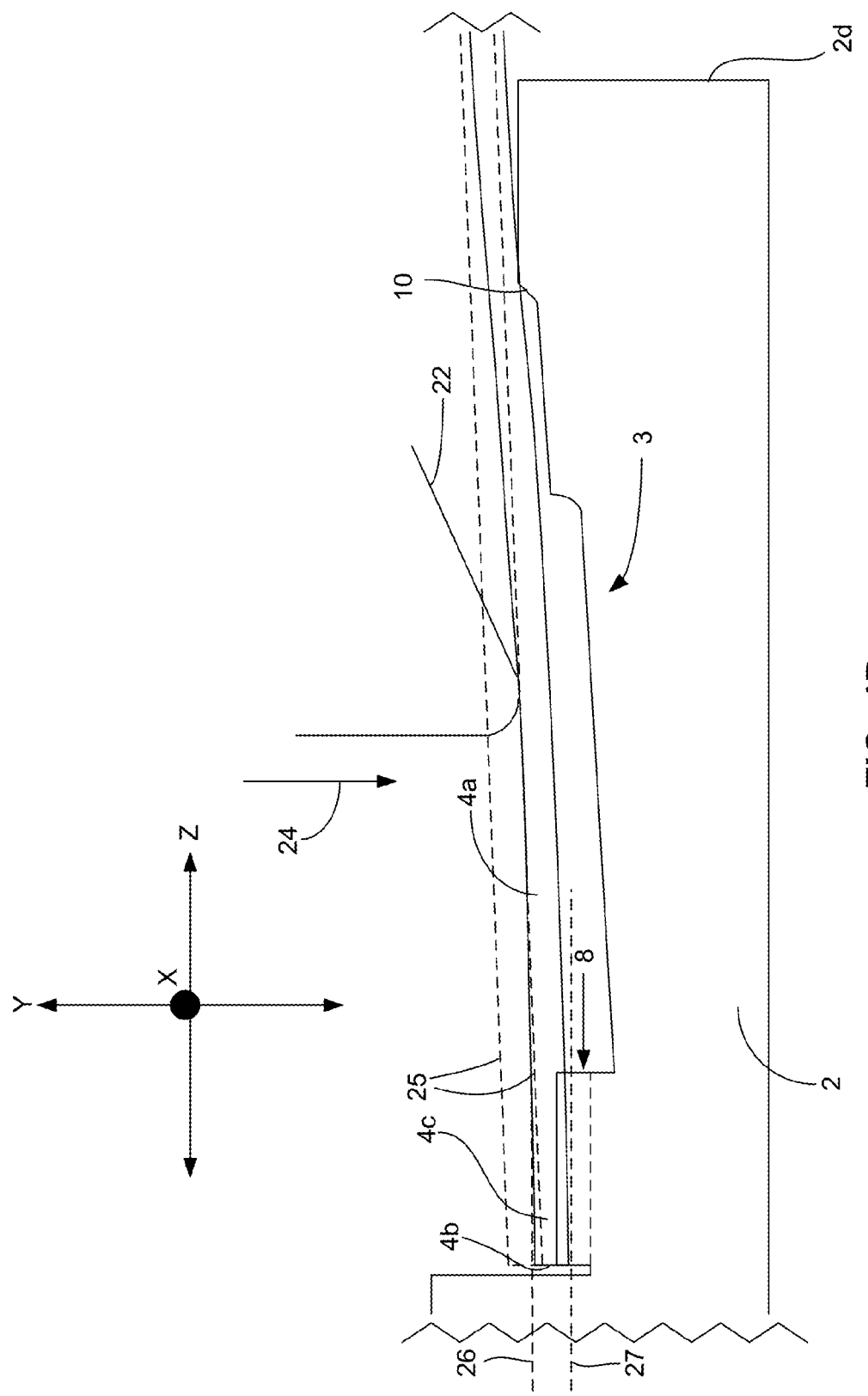
Figure 4C:
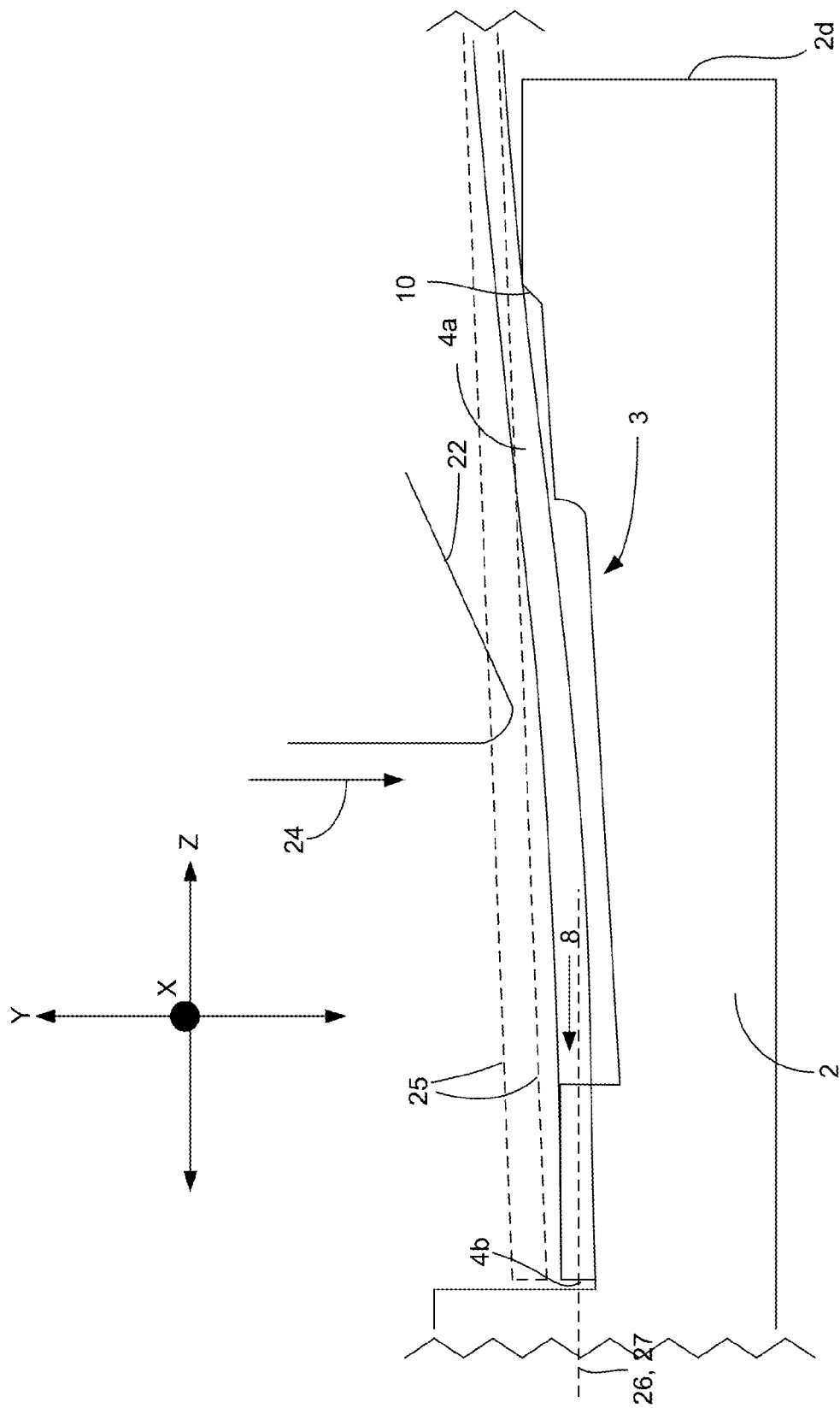

FIGS. 4A-4C illustrate side cross-sectional views of the MF connector module 1 in different stages of installment of the fiber end portions 4a in the V-grooves 8. FIG. 4A depicts the fiber installment stage when the fiber end portions 4a have been laid in the chamber 3 such that locations on the fiber end portions 4a near the back surface 2d of the module 1 are in contact with the ridge 10 and the end faces 4b of the fiber end portions 4a are suspended just above the respective V-grooves 8. FIG. 4B depicts the fiber installment stage when forming punch 22 has moved against the fiber end portions 4a causing the tips 4c of the fiber end portions 4a to come into contact with forward portions of the V-grooves 8 and causing the locations on the fiber end portions 4a near the back surface 2d of the module 1 to come into contact with the ridge 10 to form the predetermined amount of bend in the fiber end portions 4a. FIG. 4C depicts the fiber installment stage when continued movement of the forming punch 22 against the fiber end portions 4a has placed them in tangential contact with the respective V-grooves 8 along the entire, or nearly the entire, lengths of the V-grooves 8.

In FIG. 4B, the dashed lines 25 represent the shape of the fiber end portions 4a during the fiber installation stage shown in FIG. 4A. It can be seen in FIG. 4B that when the fiber end portions 4a are bent by moving the punch 22 by a predetermined amount in the Y-direction indicated by arrow 24, the optical axes 26 of at least the tips 4c of the fiber end portions 4a are parallel to the optical axes 27 of the V-grooves 8. The tips 4c are defined as a portion of the fiber end portions 4a starting at the end faces 4b and extending a distance, d, away from the end faces 4b along the lengths of the fiber end portions 4a, where d is less than the length, 1, of the V-grooves 8. As indicated above, the optical axes 27 of the V-grooves 8 correspond to the optical axes of the respective lenses 7a (FIG. 1B). Therefore, the bend formed by the punch 22 in the fiber end portions 4a does not cause the fiber end faces 4b to be directed upwardly away from the respective V-grooves 8. The bends formed in the fiber end portions 4a uses the stiffness inherent to the fibers 4 to create the appropriate individual loads needed for the respective fibers 4. This stiffness in the fiber end portions 4a causes the optical axes 26 of at least the tips 4c of the fiber end portions 4a to remain parallel to the optical axes 27 of the V-grooves 8 throughout the installation process.

The movement of the punch 22 to a predetermined location forces a shape (i.e., a bend) in the fiber end portions 4a that is determined by the contact of the fiber end portions 4a with the respective V-grooves 8, the forming punch 22 and the ridge, or corner, 10. That shape can range from where just the fiber tip 4c is in contact with the V-groove 8 to where the fiber end portion 4a is in tangential contact with the inner surfaces of the V-groove 8 along the entire length of the V-groove 8. As long as at least the tip 4c is in tangential contact with the V-groove 8, the optical axis 26 of at least the tip 4c is coaxial with the optical axis 27 of the V-groove 8. This coaxial arrangement ensures precise optical alignment of the fiber end portions 4a with the respective lenses 7a.

This also provides some tolerance for movement of the punch 22 during the installation process to allow misalignment to be avoided. If the punch 22 were to be moved in the direction indicated by arrow 24 beyond the point at which the fiber end portion 4a is in tangential contact with the V-groove 8 along the entire length of the V-groove 8, the end faces 4b would be directed upwardly and the tips 4c would not be aligned with the respective lenses 7a. As long as the positioning of the punch 22 is such that at least the tip 4c is in tangential contact with the V-groove and no more than the entire length of the V-groove 8 being in contact with the fiber end portion 4a, precise optical alignment is achieved. This also prevents the V-grooves 8 from being damaged by excessive force of the fiber end portions 4a against the V-grooves 8. Therefore, while FIG. 4C depicts the fiber end portion 4a being in tangential contact with the V-groove 8 along the entire length of the V-groove 8, this is not required to achieve precise optical alignment between the fiber end faces 4b and the respective lenses 7a.

Once the fiber end portions 4a have been installed in the respective V-grooves 8, an epoxy (not shown) is placed in the chamber 3 beneath the fiber end portions 4a. The epoxy wicks upwardly in between the fiber end portions 4a and into the V-grooves 8, but does not come into contact with the punch 22. The epoxy secures the end portions 4a to the respective V-grooves 8. The epoxy is transparent to the operating wavelength of light that is used with the MF connector module 1 and with the mating parallel optical communications module (not shown). A cover (not shown) that covers and protects the end portions 4a may be secured to the chamber 3 by the epoxy or by some other mechanism. With this design, the punch 22 remains above the fiber end portions 4a so that it is not glued into the final assembly.

Figure 5:
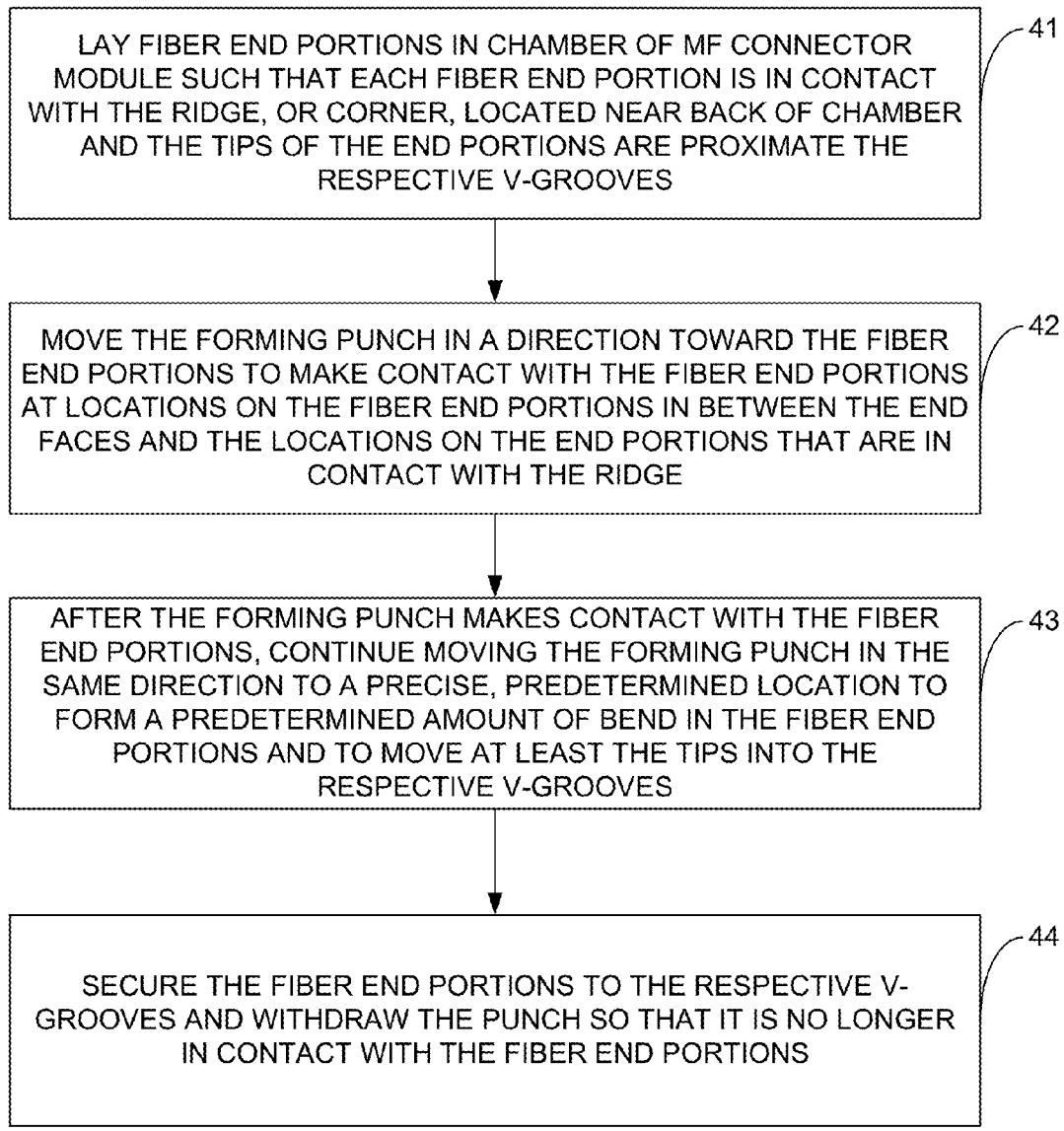
FIG. 5 illustrates a flow diagram of the method in accordance with an illustrative embodiment for installing the fiber end portions in the chamber of the MF connector module.

FIG. 5 illustrates a flow diagram of the method in accordance with an illustrative embodiment for installing the fiber end portions 4a in the chamber 3 of the MF connector module 1. The fiber end portions are first laid in the chamber of the MF connector module such that each fiber end portion is in contact with the ridge located near the back of the chamber and the tips of the fiber end portions are disposed proximate the respective V-grooves, as indicated by block 41. As indicated above, the ridge is above the V-grooves in the Y-direction, which provides space beneath the fiber end portions to allow them to be bent to set loads on them. The forming punch is then moved in the Y-direction toward locations on the fiber end portions in between the ridge and the V-grooves until the punch makes contact with the fiber end portions, as indicated by block 42. After the forming punch makes contact with the fiber end portions, the forming punch is moved to a precise, predetermined location to form a predetermined amount of bend in the fiber end portions and to move at least the tips of the fiber end portions into contact with the inner walls of the respective V-grooves. This step is represented by block 43.

As indicated above, the bend that is formed in each fiber end portions is such that the optical axes of at least the tips of the fiber end portions are parallel to the optical axes of the V-grooves. In other words, the tips of the fiber end portions are not angled upwardly away from the V-grooves. This ensures that when the fiber end portions come into contact with the respective V-grooves, at least the tips of the fiber end portions will be in tangential contact with the respective V-grooves. Once the fiber end portions have been installed in the respective V-grooves in this manner, the fiber end portions are then secured to the respective V-grooves and the punch is withdrawn so that it is no longer in contact with the fiber end portions, as indicated by block 44. As indicated above, this is typically accomplished by using epoxy that is transparent to the operating wavelength, although other mechanisms could be used for this purpose.

The ridge, or corner, 10, the punch 22 and the tangent of the V-grooves 8 determine the shape of the bent fiber end portions 4a. The shape, in turn, sets the load that forces the fiber end portions to sit correctly in the respective V-grooves 8. Thus, the relative positions of these features with respect to one another and with respect to the fiber end portions 4a are important. However, the punch 22 can make contact with the fiber end portions at different locations between the end faces 4b and the locations on the fiber end portions 4a that come into contact with the ridge 10. The ridge 10 is essentially a stop or pivot point. This function could be performed by virtually any feature capable of performing the function. Such a feature may be integrally formed in the module body 2 or it may be a separate component, element or device that is secured to the module body 2 at the proper location and with the proper orientation.

It should be noted that the invention has been described with reference to illustrative, or exemplary, embodiments in order to demonstrate the principles and concepts of the invention. As will be understood by those of skill in the art, the invention is not limited to the illustrative embodiments described herein. For example, the MF connector module 1 is an example of an MF connector module that may be configured with the ridge to allow a pre-loading bend of a predetermined amount to be formed in the fiber end portions. Persons skilled in the art will understand, in view of the description provided herein, that a variety of MF connector modules having various configurations can be provided with such a ridge and used with the method to install fiber end portions in V-grooves to achieve the benefits described above. Persons skilled in the art will understand the manner in which these and other modifications may be made to the embodiments described herein and that all such modifications are within the scope of the invention.

What is claimed is:

1. A multi-optical fiber (MF) connector module comprising:
  a module body comprising:
    a top side, a bottom side, a front end, a back end, a left side, and a right side;
    a chamber formed in the top side of the module body, the chamber having at least a front wall, a bottom, a first side wall, and a second side wall;
    a ridge, or corner, opposite the front wall of the chamber and extending in a direction that is generally parallel to the front wall of the chamber;
    an optics system disposed in or on the front wall of the chamber; and
    a plurality of V-grooves formed in the bottom of the chamber, each V-groove having a front end and a back end that is opposite the front end, the front end of each V-groove being proximate the optics system, the V-grooves having respective optical axes that are parallel to one another and generally perpendicular to the front wall of the chamber, wherein the ridge is a greater distance from the bottom side of the module body than the grooves are from the bottom side of the module body, and wherein when a plurality of end portions of optical fibers are laid in the chamber, rear locations on the fiber end portions are in contact with the ridge and end faces of the optical fibers are proximate respective V-grooves of the plurality of V-grooves.

2. The MF connector module of claim 1, wherein the difference in the distances of the ridge and the V-grooves from the bottom side of the module body causes the fiber end portions to slope downwardly from the ridge toward the respective V-grooves.

3. The MF connector module of claim 2, wherein the optics system comprises an array of lenses having respective optical axes that are coaxially aligned with the respective optical axes of the respective V-grooves.

4. The MF connector module of claim 3, wherein the difference in the distances of the ridge and the V-grooves from the bottom side of the module body allow predetermined amounts of bend to be formed in the fiber end portions to ensure that when at least tips of the fiber end portions are disposed within the respective V-grooves, optical axes of the tips are coaxially aligned with the optical axes of the respective lenses.

5. The MF connector module of claim 1, wherein the module body is a unitary part comprising plastic.

6. The MF connector module of claim 5, wherein the ridge is integrally formed in the module body.

7. The MF connector module of claim 5, further comprising at least first and second mating features disposed on the front end of the module body for mating with respective first and second mating features of a parallel optical communications module for mechanically and optically coupling the MF connector module with the parallel optical communications module.

8. A multi-optical fiber (MF) connector module assembly comprising:
   a module body comprising:
      a top side, a bottom side, a front end, a back end, a left side, and a right side:
      a chamber formed in the top side of the module body, the chamber having at least a front wall, a bottom, a first side wall, and a second side wall;
      a ridge, or corner, opposite the front wall of the chamber and extending in a direction that is generally parallel to the front wall of the chamber;
      an optics system disposed in or on the front wall of the chamber; and
      a plurality of V-grooves formed in the bottom of the chamber, each V-groove having a front end and a back end that is opposite the front end, the front end of each V-groove being proximate the optics system, the V-grooves having respective optical axes that are parallel to one another and generally perpendicular to the front wall of the chamber, wherein the ridge is a greater distance from the bottom side of the module body than the grooves are from the bottom side of the module body;
      and
   a plurality of end portions of optical fibers disposed in the chamber with at least tips of the fiber end portions disposed within the respective V-grooves and rear locations on the fiber end portions being in contact with the ridge, and wherein a predetermined amount of bend, or curve, exists in each fiber end portion between the tips and the rear locations on the fiber end portions that are in contact with the ridge, the bend in each fiber end portion being directed away from the top side of the module body toward the bottom side of the module body, the bends set respective predetermined loads on the respective fiber end portions and cause the tips to properly sit in the respective V-grooves thereby ensuring that optical axes of the tips are coaxially aligned with the optical axes of the respective V-grooves, and wherein optical axes of the tips are coaxially aligned with the optical axes of the respective V-grooves.

9. The MF connector module assembly of claim 8, wherein the optics system comprises an array of lenses having respective optical axes that are coaxially aligned with the respective optical axes of the respective V-grooves.

10. The MF connector module assembly of claim 9, wherein the module body is a unitary part comprising plastic.

11. The MF connector module assembly of claim 10, wherein the ridge is integrally formed in the module body.

12. The MF connector module assembly of claim 11, further comprising at least first and second mating features disposed on the front end of the module body for mating with respective first and second mating features of a parallel optical communications module for mechanically and optically coupling the MF connector module with the parallel optical communications module.

13. A method for installing ends of optical fibers in a multi-optical fiber (MF) connector module, the method comprising:
   providing a module body comprising:
      a top side, a bottom side, a front end, a back end, a left side, and a right side;
      a chamber formed in the top side of the module body, the chamber having at least a front wall, a bottom, a first side wall, and a second side wall;
      a ridge, or corner, opposite the front wall of the chamber and extending in a direction that is generally parallel to the front wall of the chamber;
      an optics system disposed in or on the front wall of the chamber; and
      a plurality of V-grooves formed in the bottom of the chamber, each V-groove having a front end and a back end that is opposite the front end, the front end of each V-groove being proximate the optics system, the V-grooves having respective optical axes that are parallel to one another and generally perpendicular to the front wall of the chamber, wherein the ridge is a greater distance from the bottom side of the module body than the grooves are from the bottom side of the module body;
      and
   disposing a plurality of end portions of optical fibers in the chamber with at least tips of the fiber end portions disposed within the respective V-grooves and rear locations on the fiber end portions being in contact with the ridge, and wherein a predetermined amount of bend, or curve, exists in each fiber end portion between the tips and the rear locations on the fiber end portions that are in contact with the ridge, the bend in each fiber end portion being directed away from the top side of the module body toward the bottom side of the module body, the bends set respective predetermined loads on the respective fiber end portions that cause the tips to properly sit in the respective V-grooves thereby ensuring that optical axes of the tips are coaxially aligned with the optical axes of the respective V-grooves.

14. The method of claim 13, wherein the optics system comprises an array of lenses having respective optical axes that are coaxially aligned with the respective optical axes of the respective V-grooves.

15. The method of claim 14, wherein the module body is a unitary part comprising plastic.

16. The method of claim 15, wherein the ridge is integrally formed in the module body.

17. The method of claim 13, wherein the module body further comprises at least first and second mating features disposed on the front end of the module body for mating with respective first and second mating features of a parallel optical communications module for mechanically and optically coupling the MF connector module with the parallel optical communications module.

18. The method of claim 13, wherein the step of disposing the fiber end portions in the chamber is performed by a tool having a forming punch that presses against the fiber end portions to dispose them fiber end portions in the chamber such that rear locations on the fiber end portions are in contact with the ridge and end faces of the optical fibers are proximate respective V-grooves of the plurality of V-grooves.

19. The method of claim 18, wherein the step of disposing at least the tips in the respective V-grooves is performed by a tool having a forming punch that is moved to a precise, predetermined location relative to the module body to press against the fiber end portions to thereby cause the predetermined amount of bend to be formed in each of the fiber end portions and at least the tips to be seated in the respective V-grooves.

20. The method of claim 19, wherein the precise, predetermined location to which the forming punch is moved is preselected to form the predetermined amount of bend in each of the fiber end portions, and wherein the predetermined amount of bend is preselected to cause predetermined loads to be set on the respective fiber end portions.

* * * * *